United States Patent [19]

Hatanaka et al.

[11] Patent Number: 5,782,560
[45] Date of Patent: Jul. 21, 1998

[54] INTERNAL MIXER

[75] Inventors: Takeshi Hatanaka, Hudson, Ohio;
Norifumi Yamada, Hyogo, Japan; Ko Takakura, Hyogo, Japan; Tatsuya Tanaka, Hyogo, Japan; Yoshinori Kurokawa, Hyogo, Japan

[73] Assignees: Kabushiki Kaisha Kobe Seiko Sho, Kobe, Japan; Kobelco Stewart Bolling, Inc., Hudson, Ohio

[21] Appl. No.: 670,783

[22] Filed: Jun. 24, 1996

[51] Int. Cl.$^6$ ........................................ B01F 7/02
[52] U.S. Cl. ........................ 366/298; 366/100; 366/601
[58] Field of Search .............................. 366/69, 96, 97, 366/100, 241, 279, 291, 292, 298, 601, 348; 318/85, 66, 68, 69, 70, 77

[56] References Cited

U.S. PATENT DOCUMENTS

| | | | |
|---|---|---|---|
| 2,736,754 | 2/1956 | Webb | 366/97 |
| 3,403,894 | 10/1968 | Matsuoka et al. | 366/97 |
| 3,803,464 | 4/1974 | Kuroyanagi | 318/85 |
| 4,076,220 | 2/1978 | Nakashima et al. | 366/601 |
| 4,443,110 | 4/1984 | Den Otter | 366/601 |
| 4,714,350 | 12/1987 | Nortey | 366/84 |
| 4,834,543 | 5/1989 | Nortey | 366/97 |
| 5,197,861 | 3/1993 | Maruyama et al. | 318/85 |
| 5,348,448 | 9/1994 | Ikemoto et al. | 318/85 |
| 5,372,419 | 12/1994 | Hagiwara et al. | 366/100 |
| 5,393,201 | 2/1995 | Okutani et al. | 318/85 |

FOREIGN PATENT DOCUMENTS

167693 8/1985 Japan.
64808 3/1993 Japan.

Primary Examiner—Tony G. Soohoo
Attorney, Agent, or Firm—Oblon, Spivak, McClelland, Maier & Neustadt, P. C.

[57] ABSTRACT

An internal mixer and controller enables the phase difference and the speed ratio between two rotors to be changed without stopping the operation of the mixer. The internal mixer comprises: nonintermeshed first and second rotors disposed in a mixing chamber; first and second drive units; first and second phase measuring devices; first and second speed measuring devices; and a control unit for controlling the first and second drive units on the basis of signals from the first and second speed measuring devices and signals from the first and second phase measuring devices. The control unit controls the two rotors so as to synchronously rotate at the same speed on the basis of the signals from the speed measuring devices when the two rotors fixedly rotate at the same speed. When the phase difference between the two rotors is changed, the control unit calculates the phase difference from the signals from the phase measuring devices, compares the calculated phase difference with a set phase difference, and controls the second drive unit to change the speed of the second rotor, thereby changing the phase. When the phase difference is equal to the set phase difference, the control unit again controls the two rotors so as to synchronously rotate at the same speed on the basis of the signals from the speed measuring devices. When the two rotors are rotated at different speeds, the control unit controls the drive units so that the speed of each of the rotors is equal to the set speed, respectively, on the basis of the measured speed from speed measuring devices.

7 Claims, 8 Drawing Sheets

CROSS SECTIONAL VIEW TAKEN ALONG
LINE A-A OF FIG. 6

INTERNAL MIXER

BACKGROUND OF THE INVENTION

1. Field of the Invention

The present invention relates to a nonintermeshed internal mixer which is well know as a batch mixer used for mixing high polymer materials such as rubber, plastic, and the like and a method of controlling such a mixer and, more particularly, to an internal mixer in which a phase angle and a speed ratio between two rotors can be changed during a mixing operation and a method of controlling such a mixer.

2. Description of the Related Art

As is well known, a conventional internal mixer is industrially generally used as a mixer of high polymer materials such as rubber, plastic, and the like and is often used in the rubber industry and especially in the tire industry as a main apparatus for manufacturing tire materials. Broadly speaking, there are a nonintermeshed internal mixer and an intermeshed internal mixer.

Figure 6:
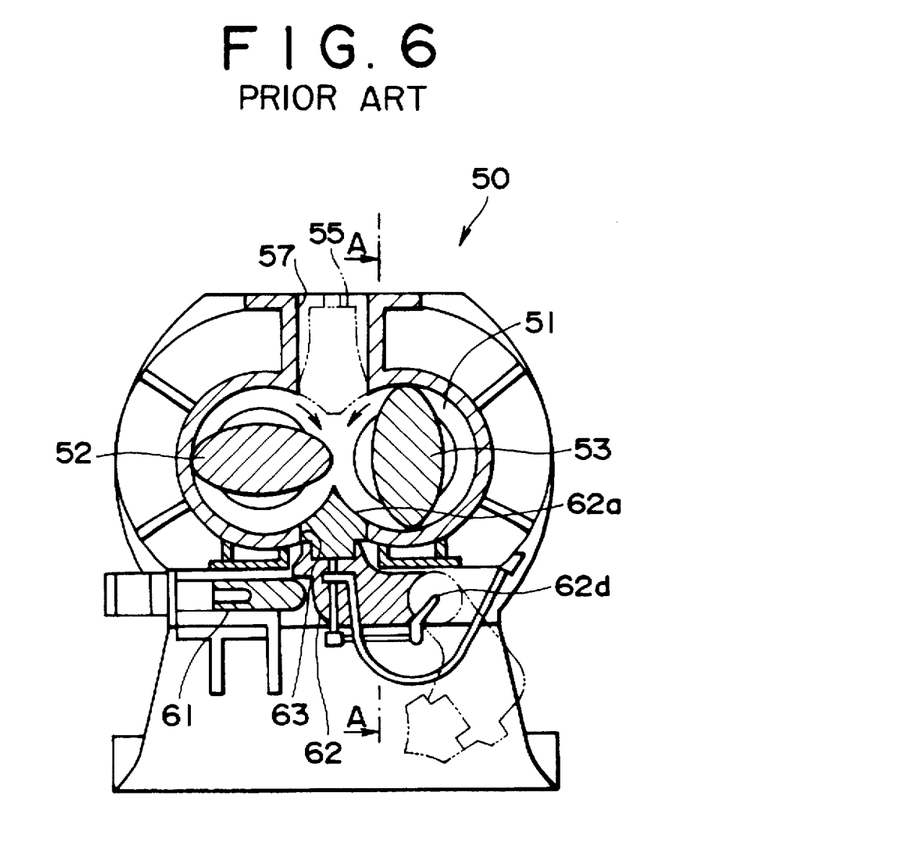
FIG. 6 is a sectional view of a conventional internal mixer.
Figure 7:
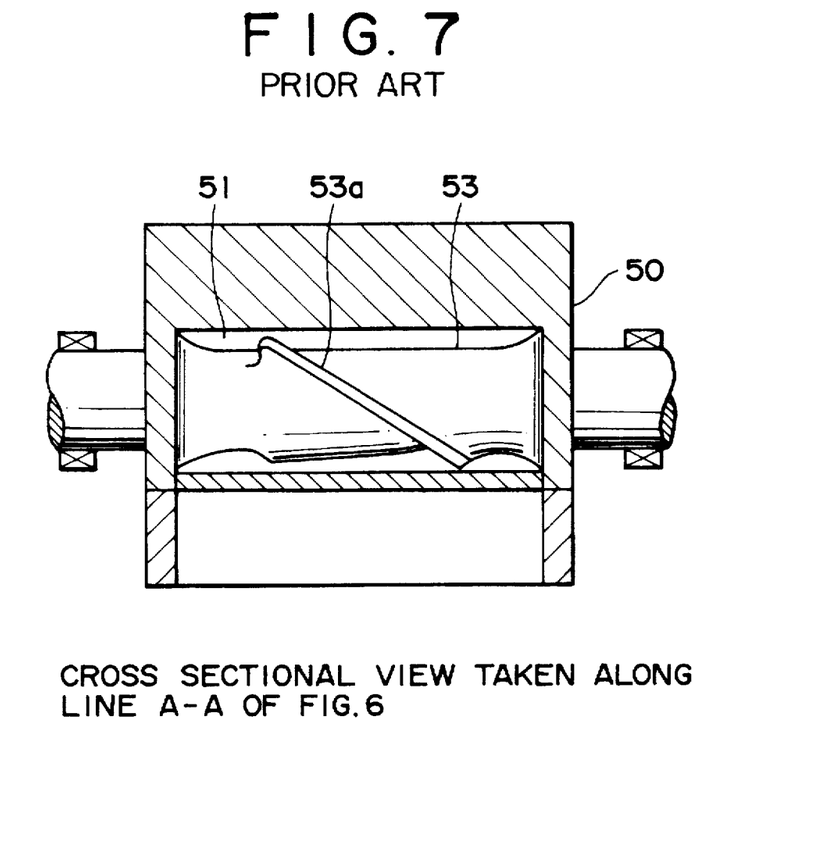
FIG. 7 is a sectional view taken along line A—A of FIG. 6.
Figure 8:
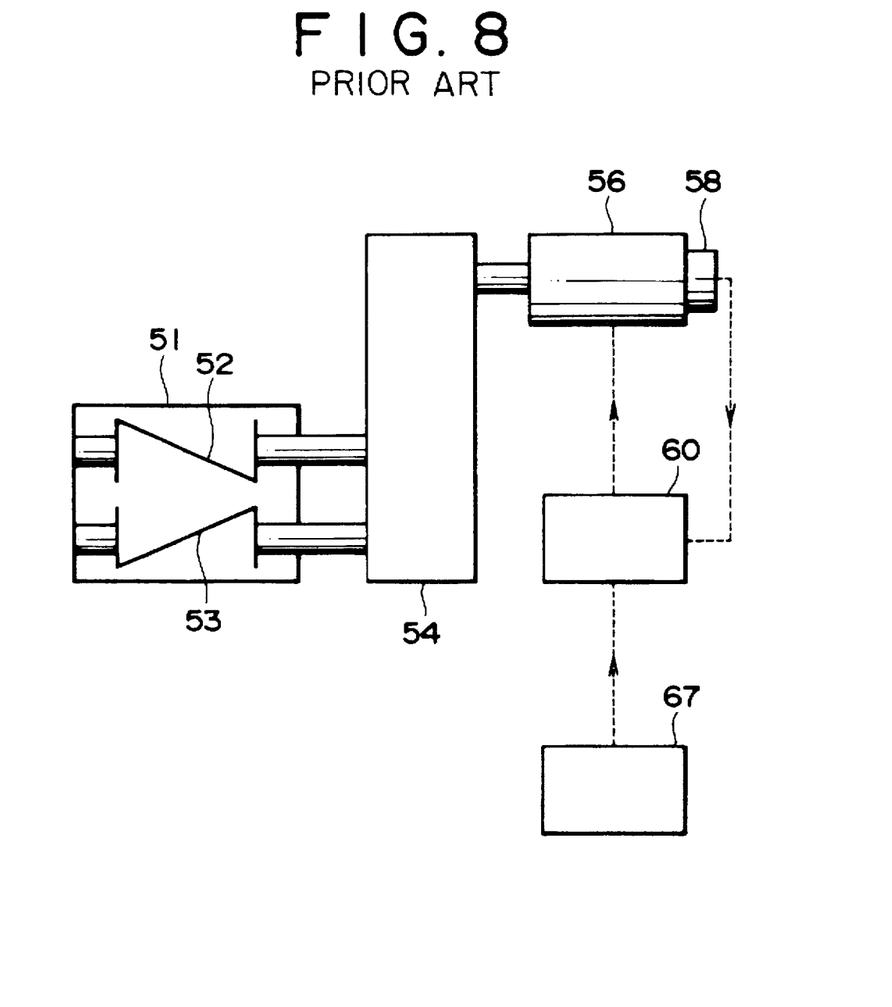
FIG. 8 is a diagram of a drive system of the conventional internal mixer when two rotors are controlled by using one drive unit.

As a conventional nonintermeshed internal mixer 50 for mixing rubber or the like, one as shown in FIGS. 6 to 8 is known. FIG. 6 is a sectional view of the conventional nonintermeshed internal mixer 50. FIG. 7 is a sectional view taken along line A—A of FIG. 6. FIG. 8 is a diagram of a drive system. Shown in FIG. 6 are: a mixing chamber 51; a first rotor 52; a second rotor 53; a latch 61; a drop door 62; a discharge port 63; a floating weight 55; and a supply port 57. The two rotors 52 and 53 are connected through a reduction gear 54 to a motor 56 as shown in FIG. 8.

The mixing chamber 51 is defined by a longitudinally elongated shield space extending between the lower portion of the floating weight 55 and a door top 62a of the drop door 62, resembling a shape formed by partly overlapping two circular cylinders. The first rotor 52 and the second rotor 53 are disposed without being intermeshed in the mixing chamber 51. Each of the first rotor 52 and the second rotor 53 has a rotor blade 53a on the circumferencial surface as shown in FIG. 7.

The first rotor 52 and the second rotor 53 are connected via the reduction gear 54 to the motor 56 as shown in FIG. 8. There are two manners of connecting the rotors 52 and 53 to the motor 56. One is such that a connecting gear is attached to the rotors 52 and 53 to integrate output axes from the reduction gear 54 into one axis. The other is such that no connecting gear is provided so that there are two output axes. The motor 56 is connected to a motor control unit 60 and is controlled by the motor control unit 60. The motor control unit 60 is connected with a speed setter 67 and a motor speed measuring device 58. The rotational speed of the motor 60 may be constant.

In the conventional internal mixer 50 with the above construction, materials are supplied from an oblong chute (not shown) attached to the supply port 57 and the floating weight 55 goes down to push the materials into the mixing chamber 51. The pushed materials are mixed by the first and second rotors 52 and 53 rotating so as to sweep the inner wall in the mixing chamber 51. After the mixing operation is finished, the latch 61 is retracted to unlock the drop door 62, the drop door 62 is rotated around a fulcrum 62d as a center and is opened so as to be fall downward, and the materials are discharged from the discharge port 63. After the discharge of the materials, the drop door 62 is rotated upward around the fulcrum 62d as a center, thereby closing the discharge port 63 of the mixing chamber 51 for the next mixing operation. When the drop door 62 is closed, the latch 61 is stretched to lock the drop door 62 so as to maintain the closed state. The materials are again pushed by the floating weight 55 from the supply port 57 into the mixing chamber 51 and the mixing operation is started. The internal mixer 57 with the above construction repeats such a mixing cycle.

In this instance, the rotation of the first and second rotors 52 and 53 is controlled by the speed control unit 60 for controlling the rotational speed of the motor 56 shown in FIG. 8. Specifically speaking, the speed control unit 60 controls the motor 56 in accordance with a set speed signal sent from the speed setter 67 when the mixing operation is started. During the mixing operation, the speed control unit 60 controls the motor 56 so as to maintain the set speed on the basis of the actual rotational speed of the motor 56 sent from the motor speed measuring device 58. The speed ratio of the second rotor 53 to the first rotor 52 is either different, that is, the rotational speeds are different or is equal to 1:1, that is, the speeds of the rotors 52 and 53 are equal. In any case, the speed ratio is determined by the number of tooth of the toothed wheel of the reduction gear 54 or the connecting gear.

The mixing operation of the internal mixer 50 is achieved by the axial forced flows of the material caused by helical rotor blades of the first rotor 52 and the second rotor 53 and transfer flows from one of the rotors 52 and 53 to the other causing macroscopic dispersion (mixing action) and flows along the sections of the first and second rotors 52 and 53 entailing strong shearing actions causing microscopic dispersion (shear dispersing action).

The internal mixer 50 of this kind is requested to improve the quality of the mixture by promoting the dispersion of an addition agent, to homogeneously mix the material to reduce variation in the quality of the mixture in the chamber, and the like. Further, it is also requested to increase the productivity by shortening the mixing time by effectively making the most of the mixing actions.

In order to satisfy those requests, many inventions in which the shape, length, helical angle of the rotor blade, the shape of the rotor drum portion, the diameter of the drum, and the like are improved have been disclosed. In case of using the rotors in the same shape, it is tried to achieve an internal mixer satisfying the requests by adjusting the speed ratio or the phase difference between the two rotors to a proper value. As inventions in which the speed ratio and the phase difference suitable for the mixing operation are shown, there are Japanese Utility Model Application No. 2-33871 and Japanese Patent Application Laid-Open No. 5-64808. There is consequently a conventional internal mixer intending to enable the speed ratio and the phase difference between the two rotors to be adjusted to proper values by realizing various speed ratios and phases.

Figure 9:
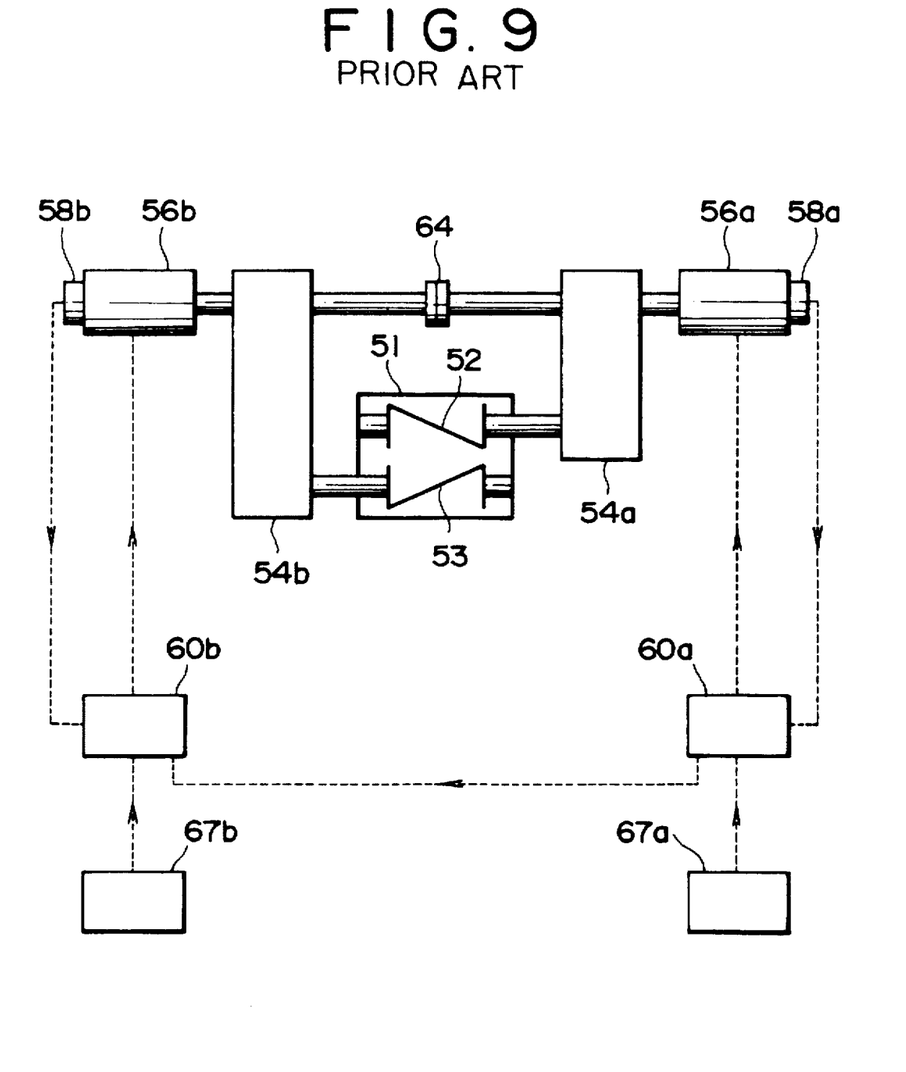
FIG. 9 is a diagram of a drive system of the conventional internal mixer when two rotors are respectively controlled by using two drive units.

FIG. 9 shows such a conventional internal mixer intending to realize the various speed ratios and phases. FIG. 9 shows an example in which nonintermeshed two rotors are respectively controlled by using two drive units. The first rotor 52 disposed in the chamber 51 is mechanically connected via a first reduction gear 54a to a first motor 56a and further, the first motor 56a is connected to a speed measuring device 58a for the first motor. Similarly, the second rotor 53 disposed in the chamber 51 is mechanically connected via a second reduction gear 54b to a second motor 56b and further, the second motor 52b is connected to a speed measuring device 58b for the second motor.

A first speed controller 60a controls the speed of the first motor 56a by using a signal from a main speed setter 67a and a feedback signal from the speed measuring device 58a for the first motor. The first speed controller 60a transmits the speed signal from the speed measuring device 58a for the first motor as a sync signal to a second speed controller 60b. The second speed controller 60b controls the speed of the second motor 56b by using the sync signal and a feedback signal from the speed measuring device 58b for the second motor. By using a signal from an auxiliary speed setter 67b, the speed of the second motor 56b can be controlled independently of the first motor 56a. When the speed ratio between the two rotors is set to 1 to 1 and the phases of the motors are fixed, a phase difference between the two rotors is certainly fixed by using a clutch 64. In case of changing the phase difference, the clutch 64 is disengaged to change the phase and is again engaged. In the conventional internal mixer as mentioned above, the various speed ratios and phases are realized by using the auxiliary speed setter 67b and the clutch 64.

The optimum values of the phase difference and the speed ratio are different depending on the nature of the material to be mixed, steps of the mixing process, and the like. For example, with respect to the mixing process of a hard rubber, it is proper in a crushing step that the phase difference is equal to 0° (when the two rotors rotate at the same speed) or that the rotors rotate at different speeds. In case of 4-wing rotors, it is considered to be proper in dispersing and homogenizing steps that the phase difference is equal to 90° (when the rotors rotate at the same speed). As mentioned above, by optimizing the phase difference and the speed ratio in accordance with the step of the process and the material to be mixed, the mixing effect is improved.

The conventional internal mixer, however, has a problem such that since the phase difference between both of the rotors is fixed by the clutch 64, the phase difference cannot be changed during the mixing operation. Particularly, the rotational speeds of the rotors are improved to increase the productivity in a recent internal mixer so that it is very difficult to change and fix the phase difference between both of the rotors by engaging/disengaging the clutch 64 during the high speed rotation. There is consequently a problem such that the rotor phase difference and the speed ratio cannot be properly changed in accordance with the mixing step while performing the mixing operation.

SUMMARY OF THE INVENTION

In consideration of the above problems, an object of the invention is to provide an internal mixer in which a phase difference and a speed ratio between two rotors can be properly changed in accordance with a step of a mixing process without stopping the operation of the mixer even during the mixing operation. Further, another object of the invention is to provide an internal mixer which can improve macroscopic and microscopic dispersion activities and the like by using various phase differences and speed ratios between the two rotors.

In order to achieve the object, there is provided an internal mixer comprising first and second rotors disposed in a mixing chamber and not intermeshed; first and second drive units for rotating the first and second rotors, respectively; first and second phase measuring devices for measuring the phases of the first and second rotors, respectively; first and second speed measuring devices for measuring the speeds of the first and second rotors, respectively; and a control unit for controlling the first and second drive units on the basis of signals from the first and second speed measuring devices and signals from the first and second phase measuring devices.

Specifically, the control unit has: a first speed setter for setting the speed of the drive unit for the first rotor; a first controller that receives a set speed signal from the first speed setter and a speed signal indicative of the measured speed from the first speed measuring device; a second speed setter for setting the speed of the drive unit for the second rotor; a second controller that receives a set speed signal from the second speed setter, a speed signal indicative of the measured speed from the second speed measuring device, and the speed signal via the first controller from the first speed measuring device; a rotor phase difference setter; a rotor phase difference processor for calculating the phase difference between the rotors on the basis of the signals from the first and second phase measuring devices; and a rotor phase difference comparator that receives a measured phase difference signal from the rotor phase difference processor and a set phase difference signal from the rotor phase difference setter and generates a phase difference change signal to the second controller.

The control unit controls the first and second drive units in the following controlling manner. When the rotational speeds of both of the rotors are equal and fixed, the control unit controls the two rotors so as to synchronously rotate at the same speed on the basis of the signals from the first and second speed measuring devices. In case of changing the phase difference between the two rotors, the control unit calculates the phase difference on the basis of the phase signals from the first and second phase measuring devices, compares the calculated phase difference with a set phase difference, and controls the second drive unit so as to change the rotational speed of the second rotor by an amount corresponding to the difference, thereby changing the phase. When it is detected that the phase difference is equal to the set phase difference on the basis of the signals from the first and second phase measuring devices, the control unit controls both of the rotors to synchronously rotate at the same speed on the basis of the signals from the first and second speed measuring devices. When both of the rotors are rotated at different speeds, the control unit controls the first and second drive units so that the speeds of the first and second drive units are equal to the set speeds, respectively, on the basis of the measured speeds from the first and second speed measuring devices.

The control unit can also control the drive units so as to cyclically or periodically change the phase difference between both of the rotors.

Further, it is preferable that a temperature measuring device for measuring temperature of the material in the mixing chamber and sending a material temperature signal to the control unit of the first and second drive units is provided, and the drive units are controlled so as to change the phase difference between both of the rotors on the basis of the temperature of the material in the mixing chamber.

In addition, it is preferable that electric power measuring devices for measuring electric power and sending an electric power signal to the control unit of the first and second drive units and/or torque measuring devices for measuring torque and sending a torque signal to the control unit of the first and second drive units is/are provided and the drive units are controlled so as to change the phase difference between both of the rotors on the basis of the electric power and/or torque.

An internal mixer according to another embodiment of the invention comprises: a first rotor and a second rotor not intermeshed with the first rotor which are disposed in a mixing chamber; a drive unit for rotating both of the first and second rotors; a first transmission axis for transmitting driving force from the drive unit to the first rotor and a second transmission axis for transmitting driving force from the drive unit to the second rotor; a first phase measuring device for measuring phase of the first rotor and a second phase measuring device for measuring phase of the second rotor; a first speed measuring device for measuring speed of the first rotor and a second speed measuring device for measuring speed of the second rotor; a variable speed controller attached to the second transmission axis; and a control unit or controlling the variable speed controller on the basis of signals from the first and second speed measuring devices and signals from the first and second phase measuring devices.

The second transmission axis includes an input axis to which driving force is applied and an output axis for outputting the driving force to the second rotor. The variable speed controller comprises: a first sun gear connected to one end of the input axis; a planet gear engaged with the outer periphery of the first sun gear; a second sun gear whose diameter is larger than that of the first sun gear and which has the planet gear on the inner side; rotation transmitting means for transmitting the rotation of the planet gear to the output axis; and second sun gear driving means for driving the second sun gear.

Specifically speaking, bevel gears are used as the first sun gear, the planet gear, and the rotation transmitting means and, the variable speed controller comprises: a first sun gear which is a bevel gear connected to one end of the input axis; a planet gear which is a bevel gear engaging with the first sun gear; a second sun gear whose diameter is larger than that of the first sun gear and which has the planet gear on the inner side; an output bevel gear connected to one end of the output axis on the side facing the first sun gear of the input axis and engaged with the planet gear; and second sun gear driving means for driving the second sun gear.

When the phase difference between the first and second rotors is changed, the control unit for controlling the variable speed controller calculates the phase difference on the basis of the phase signals from the first and second phase measuring devices, compares the calculated phase difference with a set phase difference and transmits a signal to the variable speed controller to change the rotational speed of the second rotor only by an amount corresponding to the difference obtained from the comparison, thereby changing the phase. When it is detected that the phase difference is equal to the set phase difference on the basis of the signals from the first and second phase measuring devices, the control unit controls the variable speed controller so that both of the rotors synchronously rotate at the same speed on the basis of a signal from the first speed measuring device. When the first and second rotors are rotated at different speeds, the control unit controls the variable speed controller so that the speed ratio between the first and second rotors is equal to the set speed ratio on the basis of the measured speed from the first speed measuring device.

In the internal mixer of the invention, since the phase difference and the speed ratio are fixed on the basis of the feedback signals from the speed measuring devices and the phase measuring devices without using a mechanical means such as a clutch, the phase difference and the speed ratio can be changed and fixed only by changing the control signals of the set values even during the mixing operation. Consequently, the optimum phase difference and speed ratio, that is, which enable each step of the mixing process to be efficiently performed can be selected in the step in the mixing process.

As is generally known, the mixing process comprises a crushing step, a mixing step, a dispersing step, and a homogenizing step. The optimum phase differences and speed ratios are different depending on the steps. For example, when the speeds of the rotors are equal, the phase difference of 0° is considered to be optimum in the crushing step. When the internal mixer of the invention is used, the optimum phase difference and speed ratio, that is, by which the step in the mixing process can be efficiently performed can be selected, so that the quality of the mixture can be improved by promoting the dispersion of an addition agent and a homogenous mixing operation or the like in which variation in the quality of the mixture in the chamber is reduced can be realized. Further, since the macroscopic and microscopic dispersion can be fully acted by using the various rotor phases and speed ratios, the mixing time can be shortened and the productivity is increased.

Particularly, in case of cyclically or periodically changing the phase difference in each step of the mixing process, the more homogeneous mixing operation can be performed.

When the temperature measuring device is provided, the temperature of the material can be optionally controlled by changing the phase difference in accordance with the temperature of the material in the steps of the mixing process, especially in the dispersing and homogenizing steps. For example, by setting the phase difference to 90° in which an agitating operation can be well performed and necessary power is relatively smaller than a case when the phase difference is set to 0° in which a large amount of power is generally necessary, generation of heat can be suppressed.

When the electric power measuring device and/or the torque measuring device is/are provided, energy applied to the material can be optionally controlled by changing the phase difference in accordance with the necessary power and/or torque in the steps of the mixing process. A peak load which occurs can be avoided by the phase control, so that it is good for protection of the machine. For example, by setting the phase difference to 90° in which an agitating operation can be well performed and necessary power is relatively smaller than a case where the phase difference is set to 0° in which a large amount of power is generally necessary, energy can be suppressed and it is good for protection of the machine.

DETAILED DESCRIPTION OF THE PREFERRED EMBODIMENTS

Figure 1:
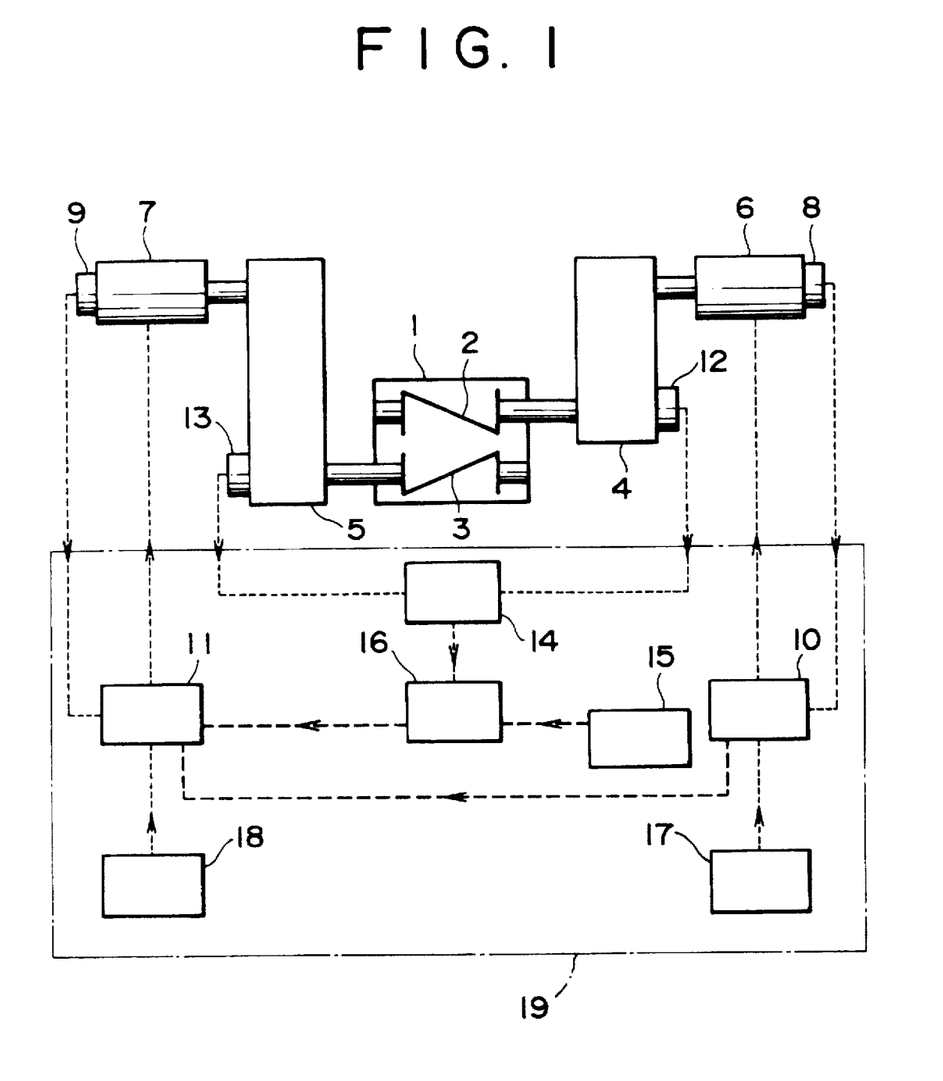
FIG. 1 is a diagram of a drive system of an internal mixer according to an embodiment of the invention when two rotors are respectively controlled by using two drive units.

Embodiments of the invention will be described hereinbelow with reference to the drawings. FIG. 1 is a diagram of a drive system of an internal mixer according to the invention. Shown in FIG. 1 are a chamber 1, a first rotor 2, a second rotor 3, a first reduction gear 4, a second reduction gear 5, a first electric motor 6, a second electric motor 7, a first speed measuring device 8, a second speed measuring device 9, and a control unit 19 for controlling the first and second electric motors 2 and 3.

The internal mixer of the invention shown in FIG. 1 relates to an example in which the first rotor 2 and the second rotor 3 which are not intermeshed are disposed in the chamber 1 and are respectively driven by the first motor 6 and the second motor 7. The first rotor 2 disposed in the chamber 1 is mechanically connected via the first reduction gear 4 to the first motor 6 and a first phase measuring device 12. Further, the first motor 6 is connected to the first speed measuring device 8. Similarly, the second rotor 3 disposed in the chamber 1 is mechanically connected via the second reduction gear 5 to the second motor 7 and a second phase measuring device 13. Further, the second motor 7 is connected to the second speed measuring device 9.

In this case, it is necessary to use a motor which is capable of positioning output shaft as each of the first and second motors 6 and 7 and a controller for the motor which is capable of positioning motor output shaft as each of the first and second speed controllers 10 and 11. A servo motor and a drive unit can be applicable as an example of this motor and its controller. Resolvers, encoders, and the like are used as the first and second speed measuring devices 8 and 9 and the first and second phase measuring devices 12 and 13. The first and second phase measuring devices 12 and 13 can be omitted by calculating the phases of the first and second rotors by executing an arithmetic operation such as a dividing or the like to signals of the first and second speed measuring devices 8 and 9.

Specifically speaking, the control unit 19 for controlling the first and second motors 6 and 7 comprises: a first speed setter 17, for setting the speed of the motor 6 for the first rotor; a first controller 10 that receives a set speed signal from the first speed setter 17 and a detection speed signal from the first speed measuring device 8; a second speed setter 18 for setting the speed of the motor 7 for the second rotor; a second controller 11 that receives a set speed signal from the second speed setter 18, a detection speed signal from the second speed measuring device 9, and a speed signal via the first controller 10 from the first speed measuring device 8; a rotor phase difference setter 15; a rotor phase difference processor 14 for calculating the phase difference between the rotors on the basis of signals from the first and second phase measuring devices 12 and 18; and a rotor phase difference comparator 16 that receives a detection phase difference signal from the rotor phase difference processor 14 and a set phase difference signal from the rotor phase difference setter 15 and generates a phase difference change signal to the second controller 11.

A potentiometer, digital setters, and the like are used as the rotor phase difference setter 15 and the first and second speed setters 17 and 18, thereby enabling the setting to be changed during the operation. Processors for comparing electric signals of voltage, current, and the like are used as the rotor phase difference processor 14 and the rotor phase difference comparator 16. Consequently, a device capable of programming such as a computer, a logic controller, or the like is optimum as a device including the functions of the rotor phase difference processor 14, rotor phase difference setter 15, rotor phase difference comparator 16, and first and second speed setters 17 and 18.

The controller 19 with the above construction controls the first and second motors as follows. When the rotors are rotated with a predetermined phase difference at the same speed, the first controller 10 controls the speed of the first motor 6 on the basis of the set speed signal from the first speed setter 17 and the detection speed signal (feedback signal) from the first speed measuring device 8. The first controller 10 transmits the detection speed signal from the first speed measuring device 8 as a sync signal to the second controller 11. The second controller 11 controls the speed of the second motor 7 by using the sync signal and the detection speed signal (feedback signal) from the second speed measuring device 9, thereby controlling the rotors so as to synchronously rotate.

When the phase difference between the two rotors is changed during the mixing operation, a set value of the rotor phase difference setter 15 is changed. The rotor phase difference setter 15 sends a set phase difference signal to the rotor phase difference comparator 16. On the other hand, the rotor phase difference processor 14 calculates the phase difference of the rotors on the basis of the measured phase signals from the first phase measuring device 12 and the second phase measuring device 13 and sends a calculated phase difference signal to the rotor phase difference comparator 16. The rotor phase difference comparator 16 compares the calculated phase difference with the set phase difference and sends the phase change signal to the second controller 11 so as to change the rotational speed of the second rotor 3 by an amount corresponding to the difference. When the phase change signal from the rotor phase difference comparator 16 is received, the second controller 11 ignores the sync signal from the first controller 10 and adjusts the speed of the second motor 7 so that the phase difference is equal to the set phase difference.

When it is detected by the rotor phase difference comparator 16 or the like that the phase difference between the two rotors coincides with the set phase difference, the synchronous operation is again executed by the sync from the first controller 10.

When the rotors are rotated at different speeds, the first controller 10 controls the speed of the first motor 6 on the basis of the set speed signal from the first speed setter 17 and the detection speed signal (feedback signal) from the first speed measuring device 8. The second controller 11 controls the speed of the second motor 6 on the basis of the set speed signal from the second speed setter 18 and the detection speed signal (feedback signal) from the second speed measuring device 9.

In the phase control by the rotor phase difference processor 14, rotor phase difference setter 15, and rotor phase difference comparator 16, not only when the phase is changed but it is preferable to always monitor the phase difference of the rotors so as to be constant by using the measured phase signals from the first and second phase measuring deuces 12 and 13 as feedback signals.

The drive units can be also controlled so as to cyclically or periodically change the phase difference between the rotors by the control unit 19 to obtain the mixture which is more homogeneous.

Figure 2:
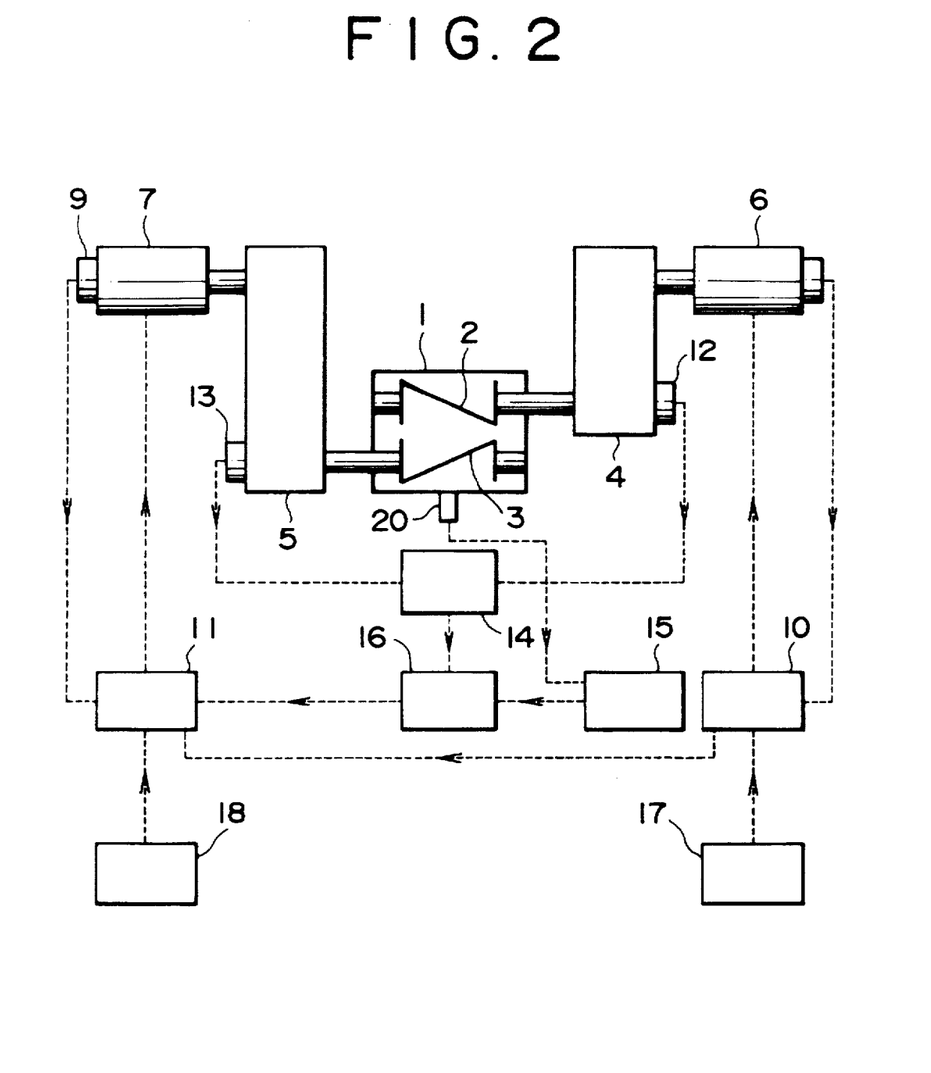
FIG. 2 is a diagram of a drive system of the internal mixer shown in FIG. 1 when a temperature measuring device is provided.

An internal mixer shown in FIG. 2 relates to an example in which a temperature measuring device 20 for measuring the temperature of a material in the mixing chamber 1 is provided to the embodiment shown in FIG. 1 and the phase difference between the two rotors is optionally changed by feeding back a material temperature signal to the rotor phase difference setter 15. In this manner, the temperature of the material can be optionally controlled by changing the phase difference in accordance with the material temperature in each of the steps of the mixing process, especially in the dispersing and homogenizing steps.

Figure 3:
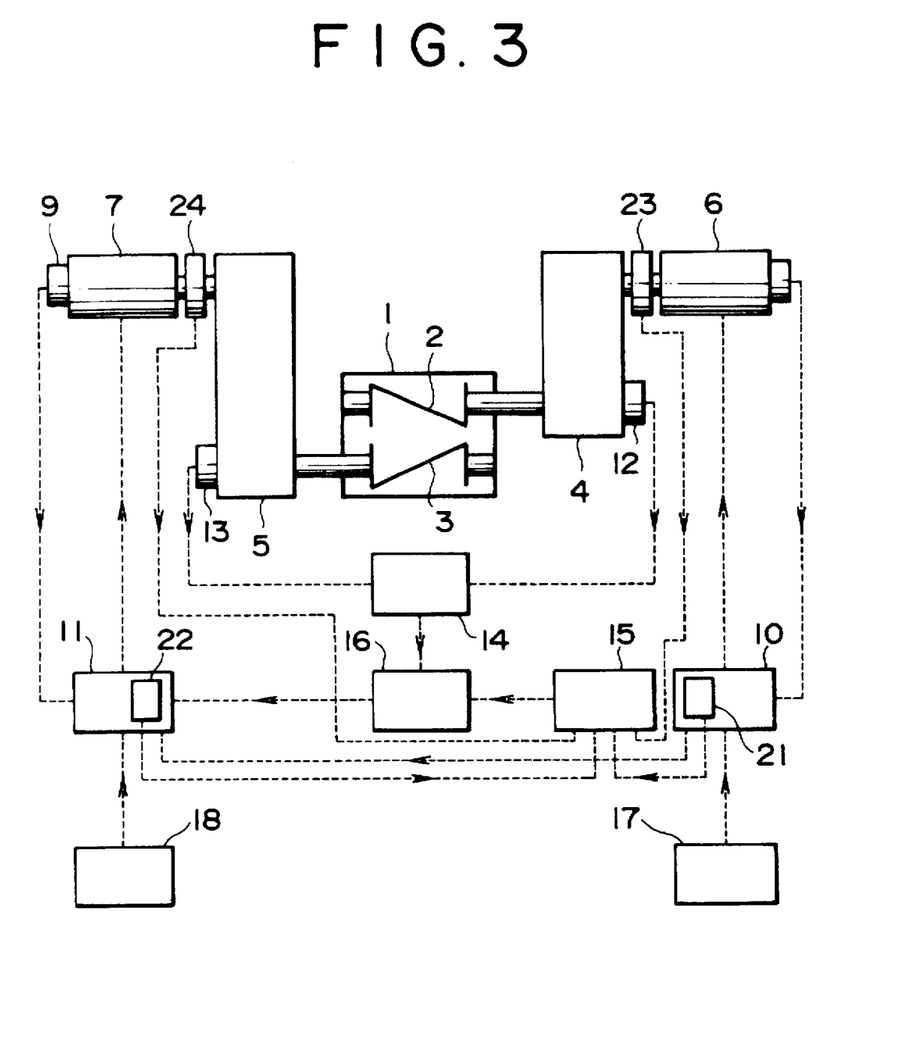
FIG. 3 is a diagram of a drive system of the internal mixer shown in FIG. 1 when electric power measuring devices and torque measuring devices are provided.

In addition, an internal mixer shown in FIG. 3 relates to an example in which first and second electric power measuring devices 21 and 22 for measuring electric power of the first and second drive units 6 and 7 and/or first and second torque measuring devices 23 and 24 for measuring torque of the first and second drive units 6 and 7 are provided to the embodiment shown in FIG. 1 and the phase difference between the two rotors is optionally changed by feeding back an electric power signal and/or a torque signal to the rotor phase difference setter 15. In this manner, energy applied to the material can be optionally controlled in each step in the mixing process by changing the phase difference in accordance with necessary electric power or torque. A peak load which occurs can be avoided by controlling the phase, so that it is good for protection of the machine.

Figure 4:
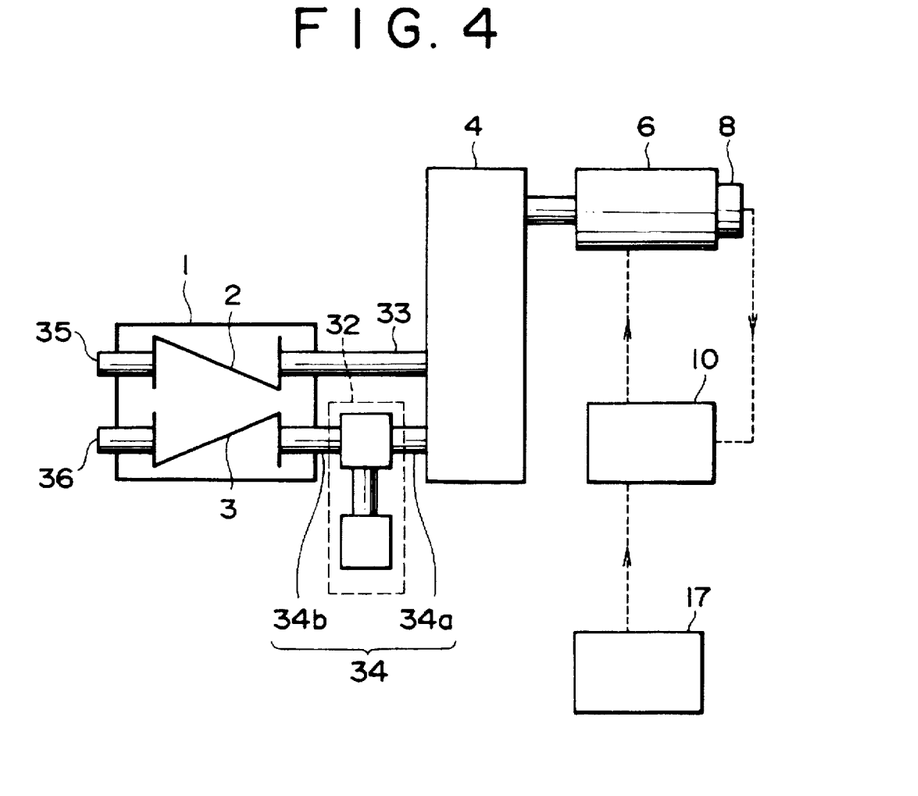
FIG. 4 is a diagram of a drive system of an internal mixer according to an embodiment of the invention when two rotors are controlled by using one drive unit.
Figure 5:
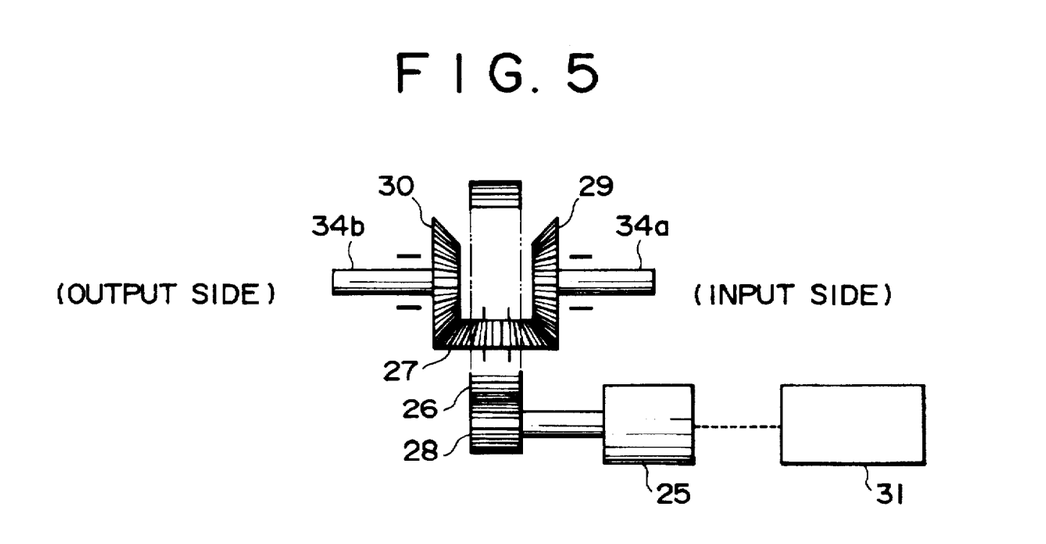
FIG. 5 is a diagram showing a variable speed controller in the internal mixer shown in FIG. 4.

Another embodiment of the internal mixer of the invention is shown in FIGS. 4 and 5. FIGS. 4 and 5 show an example of the internal mixer of the invention in which two rotors which are not intermeshed are controlled by using one drive unit. In FIG. 4, first and second transmission axes 33 and 34 are respectively connected to one ends of the nonintermeshed first and second rotors 2 and 3 disposed in the mixing chamber 1 and first and second phase and speed measuring devices 35 and 36 for measuring the phases and speeds of the rotors are connected to the other ends, respectively. The first and second transmission axes 33 and 34 are connected via the reduction gear 4 to the motor 6. The motor 6 is connected to the motor control unit 10 and is controlled by the motor control unit 10. The speed setter 17 and the motor speed measuring device 8 are connected to the motor controller 10. The second transmission axis 34 is provided with a variable speed controller 32. The variable speed controller 32 is controlled by a control unit 31 on the basis of signals from the first and second phase speed measuring devices 35 and 36.

The second transmission axis 34 is constructed by an input axis 34a to which driving force is applied and an output axis 34b which transmits the driving force to the rotor 8. The variable speed controller 32 comprises: a first sun gear 29 connected to one end of the input axis 34a; a planet gear 27 engaged with the outer periphery of the first sun gear 29; a second sun gear 26 whose diameter is larger than that of the first sun gear 29 and has the planetary gear 27 on the inner side; a rotation transmitting means 30 for transmitting the rotation of the planet gear 27 to the output axis 34b; and second sun gear driving means 28 and 25 for driving the second sun gear 26.

Specifically, in the variable speed controller 32, bevel gears are used as the first sun gear 29, planet gear 27, and rotation transmitting means 30. The variable speed controller 32 comprises: the first sun gear (bevel gear) 29 connected to one end of the input axis 34a; the planet gear (bevel gear) 27 engaging with the first sun gear 29; the second sun gear 26 whose diameter is larger than that of the first sun gear 29 and in which the planet gear 27 is fixed on the inner side; an output bevel gear 30 connected to one end of the output axis 34b on the side facing the sun gear 29 of the input axis 34a and engaged with the planet gear 27; and the second sun gear driving means constructed by a pinion gear 28 engaged with the second sun gear 26 and a servo motor 25.

In the variable speed controller, the drive of the servo motor 25 is transmitted via the pinion gear 28 to the second sun gear 26. Since the planet gear 27 is fixed to the second sun gear 26, the rotation of the planet gear 27 has composite speed obtained from the rotational speed of the second sun gear 26 and the rotational speed transmitted from the first sun gear 29. When the composite speed of the planet gear 27 is adjusted by adjusting the driving force of the servo motor 25, the speeds of the two rotors can be set to be different or the same.

When the phases of both of the rotors 1 and 2 are changed by the control unit 31, the phase difference is calculated on the basis of phase signals from the first and second phase and speed measuring devices 35 and 36, the calculated phase difference is compared with the set phase difference, and a phase change signal is transmitted to the servo motor 25 to change the rotational speed of the second rotor 3 only by an amount corresponding to the difference. The servo motor 25 applies the rotational force via the pinion gear 28 to the second sun gear 26 so as to obtain the set phase difference. When it is detected that the phase difference is equal to the set phase difference on the basis of signals from the first and second phase measuring devices, the control unit 31 controls the servo motor 26 so that both of the rotors rotate at the same speed on the basis of a signal from first speed measuring means.

When the two rotors are rotated at different speeds, the control unit 31 controls by sending a signal to the servo motor 25 so that the speed ratio between the two rotors is equal to the set speed ratio on the basis of the detection speed from the first speed measuring device.

In the variable speed controller, it is also possible that the bevel gears are not used as the first sun gear, planet gear, and rotation transmitting means. The variable speed controller can also comprise: a planetary gear in which a first sun gear, a plurality of planet gears and a second sun gear are disposed so as to be included in the same plane and are intermeshed each other; rotation transmitting means in an axis shape for transmitting the rotation of the plurality of planet gears to the output axis; and second sun gear driving means for driving the second sun gear.

What is claimed is:

1. An internal mixer comprising:
   a mixing chamber;
   non-intermeshing first and second rotors disposed in said mixing chamber;
   first and second drive units for respectively and independently driving said first and second rotors;
   first and second phase measuring devices for respectively measuring phases of said first and second rotors;
   first and second speed measuring devices for respectively measuring speeds of said first and second rotors; and
   control means responsive to said first and second phase measuring devices and said first and second speed measuring devices for controlling said first and second drive units, wherein said control means comprises means for changing a phase difference between said first and second rotors.

2. The internal mixer according to claim 1, wherein the control means comprises:
   a first speed setter for setting operating speed of the first drive unit for rotating the first rotor and outputting a set speed signal;
   a first controller that receives a set speed signal from the first speed setter and a speed signal indicating a measured speed from the first speed measuring device;

a second speed setter for setting a speed of the drive unit for the second rotor;

a second controller that receives a set speed signal from the second speed setter, a speed signal indicating a measured speed from the second speed measuring device, and the speed signal via a first controller from the first speed measuring device;

a rotor phase difference setter outputting a measured phase difference signal;

a rotor phase difference processor for calculating a phase difference between the first and second rotors on the basis of signals from the first and second phase measuring devices and outputting a measured phase difference signal; and a rotor phase difference comparator that receives a measured phase difference signal from the rotor phase difference processor and a set phase difference signal from the rotor phase difference setter and generates a phase difference change signal to the second controller.

3. The internal mixer according to claim 1, further comprising a temperature measuring device for measuring the temperature of a material in the mixing chamber and transmitting a material temperature signal to the control means to change the phase difference on the basis of the temperature of the material in the mixing chamber.

4. The internal mixer of claim 1 wherein said control means comprises a rotor phase difference processor responsive to said first and second phase measuring devices to determine a phase difference of said first and second rotors, and a rotor phase difference comparator which compares the rotor phase difference from said rotor phase difference processor to a phase difference set value, and wherein said means for changing a phase difference between said first and second rotors comprises a rotor phase difference setter having plural set values which may be fed to said rotor phase difference comparator.

5. The internal mixer of claim 1 wherein said control means comprise means for controlling the speed of said first and second rotors based on the rotational speed of at least one of said rotors when the phase difference is not being changed, and for controlling the speed of said first and second rotors based on the phase difference when the phase difference is being changed.

6. The internal mixer of claim 1 including an electric power measuring device for measuring electric power of said first and second drive units and transmitting an electric power signal to said control means for changing the phase difference based on the electric power signal.

7. The internal mixer of claim 1 including a torque measuring device for measuring a torque of said first and second drive units and transmitting a torque signal to said control means for changing the phase difference based on the torque signal.

* * * * *